US008799983B2

(12) United States Patent
Yoakum

(10) Patent No.: US 8,799,983 B2
(45) Date of Patent: *Aug. 5, 2014

(54) INSIGHT DISTRIBUTION

(75) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 802 days.

This patent is subject to a terminal disclaimer.

(21) Appl. No.: 12/125,644

(22) Filed: May 22, 2008

(65) Prior Publication Data

US 2009/0293099 A1 Nov. 26, 2009

(51) Int. Cl.
H04L 29/06 (2006.01)
(52) U.S. Cl.
USPC ............. 726/1; 726/2; 726/7; 726/18; 726/19
(58) Field of Classification Search
USPC .......................................................... 726/1
See application file for complete search history.

(56) References Cited

U.S. PATENT DOCUMENTS

| 6,714,944 | B1 * | 3/2004 | Shapiro et al. ................ 1/1 |
|---|---|---|---|
| 6,988,075 | B1 | 1/2006 | Hacker |
| 7,275,259 | B2 | 9/2007 | Jamieson et al. |
| 7,748,032 | B2 | 6/2010 | Simmons |
| 8,112,789 | B2 | 2/2012 | Halls et al. |
| 8,255,989 | B2 | 8/2012 | Medvinsky et al. |
| 2001/0032100 | A1 | 10/2001 | Mahmud et al. |
| 2003/0188193 | A1 | 10/2003 | Venkataramappa |
| 2004/0139319 | A1 | 7/2004 | Favazza et al. |
| 2005/0154664 | A1 | 7/2005 | Guy et al. |
| 2006/0018520 | A1 * | 1/2006 | Holloran ................ 382/116 |
| 2006/0107311 | A1 | 5/2006 | Dawson et al. |
| 2006/0123465 | A1 | 6/2006 | Ziegler |
| 2006/0137001 | A1 | 6/2006 | Foster et al. |
| 2006/0248593 | A1 | 11/2006 | Dennis et al. |
| 2007/0078687 | A1 | 4/2007 | Dettinger et al. |
| 2007/0107048 | A1 | 5/2007 | Halls et al. |
| 2007/0156692 | A1 * | 7/2007 | Rosewarne ................ 707/9 |

(Continued)

FOREIGN PATENT DOCUMENTS

| CA | 2524294 A1 | 11/2004 |
|---|---|---|
| WO | 2004102329 A2 | 11/2004 |
| WO | 2007047183 A2 | 4/2007 |
| WO | 2007061946 A2 | 5/2007 |

OTHER PUBLICATIONS

International Search Report for PCT/IB2008/001186, mailed Sep. 30, 2008.

(Continued)

Primary Examiner — Mohammad L Rahman
(74) Attorney, Agent, or Firm — Withrow & Terranova, PLLC

(57) ABSTRACT

The present invention relates to using authorization information provided by an asserting agent to control insight-related interactions between a receiving agent and an insight agent. The insight may be information that relates to an entity with whom or a device with which the asserting agent is associated. Such insight is generally referred to as insight of the asserting agent. An insight source maintains the insight of the asserting agent, and the insight agent provides controlled access to the insight by the receiving agent through the insight-related interactions. For others to gain access to at least certain of the asserting agent's insight, the asserting agent must authorize the insight agent to provide the asserting agent's insight to the receiving agent. Upon obtaining the proper authorization, the insight agent will interact with the receiving agent and distribute the asserting agent's insight to the receiving agent.

25 Claims, 4 Drawing Sheets

(56) References Cited

U.S. PATENT DOCUMENTS

| | | |
|---|---|---|
| 2007/0192137 A1 | 8/2007 | Ombrellaro |
| 2008/0155267 A1 | 6/2008 | Lieber |
| 2008/0222038 A1* | 9/2008 | Eden et al. .................. 705/44 |
| 2009/0043691 A1* | 2/2009 | Kasower ...................... 705/39 |
| 2012/0117634 A1 | 5/2012 | Halls et al. |

OTHER PUBLICATIONS

International Search Report for PCT/IB2009/005663, mailed Sep. 8, 2009.

Notice of Allowance for U.S. Appl. No. 11/961,783 mailed Mar. 1, 2013, 11 pages.

Examination Report for British patent application GB1021492.2 mailed Aug. 30, 2013, 5 pages.

Non-final Office Action for U.S. Appl. No. 11/961,783 mailed Aug. 28, 2012, 8 pages.

KIPO's Notice of Preliminary Rejection for Korean Patent Application No. 10-2009-7027531 mailed Apr. 14, 2014, 11 pages.

* cited by examiner

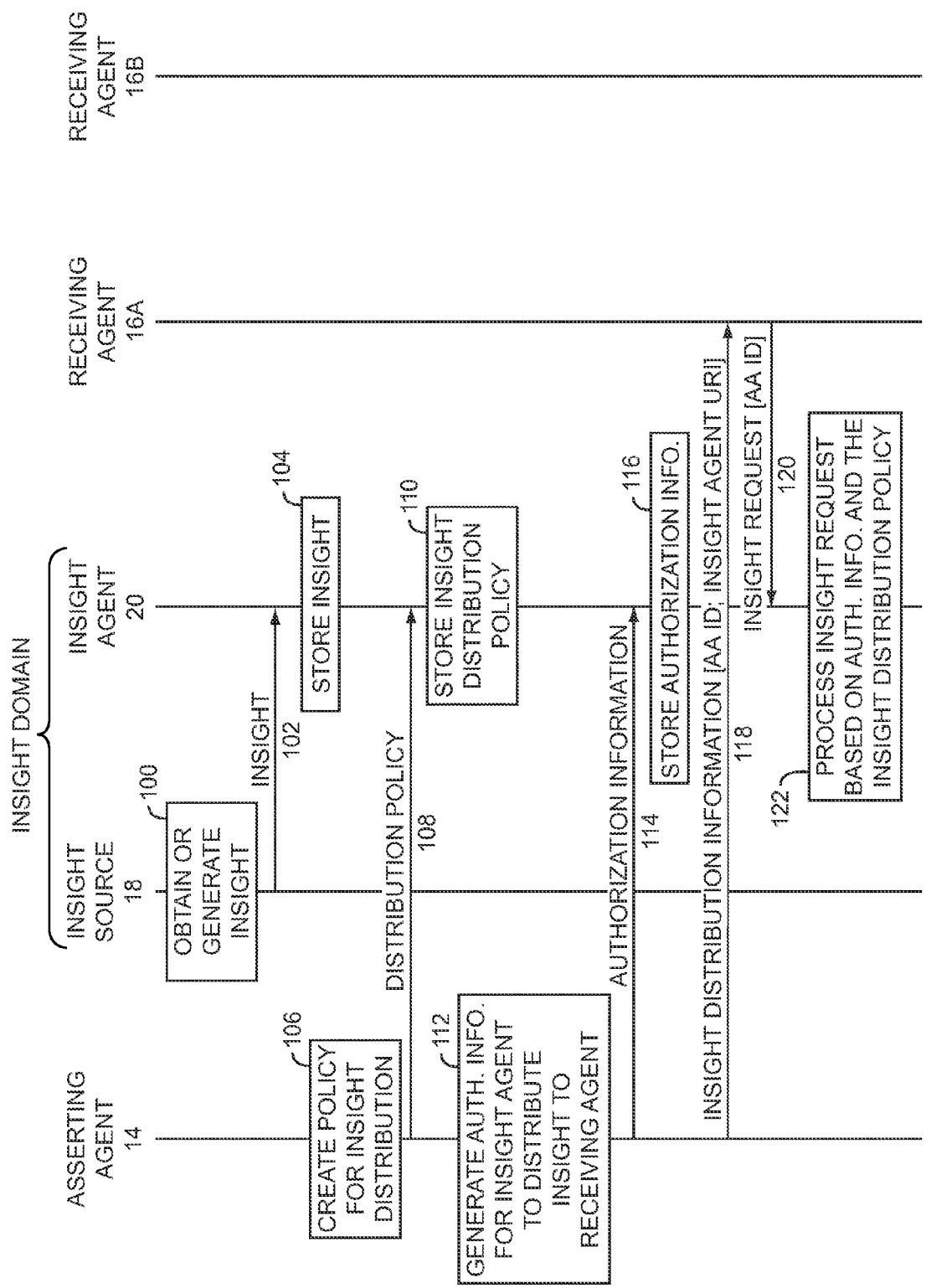

INSIGHT DISTRIBUTION

FIELD OF THE INVENTION

The present invention relates to an entity's insight, and in particular to controlling the distribution of an entity's insight.

BACKGROUND OF THE INVENTION

In many instances, valuable information about a person is maintained or collected by a third party. This information is often primarily controlled by the third party and not controllable to any significant extent by the person who is the subject of the information. Such information is referred to as insight for clarity. Insight may range from the credit related information that is maintained by credit bureaus to location or presence information that is maintained by various institutions, such as communication service providers.

Insight about a person or entity is often valuable to others, assuming the institutions that generate or maintain the insight are trustworthy. In many instances, it is important to ensure that the insight of a person or entity cannot be manipulated by the person or entity. However, it is desirable to allow the person associated with the insight to control how and to whom the insight is distributed. Unfortunately, most institutions that distribute insight or require insight have no mechanisms in place to allow the person associated with the insight to effectively and efficiently control distribution of the insight.

Accordingly, there is a need for an effective and efficient way to allow the person associated with the insight to control distribution of the insight

SUMMARY OF THE INVENTION

The present invention relates to using authorization information provided by an asserting agent to control insight-related interactions between a receiving agent and an insight agent. The insight may be information that relates to an entity with whom or a device with which the asserting agent is associated. For clarity and ease of discussion, such insight is generally referred to as insight of the asserting agent. The insight source maintains the insight of the asserting agent, and the insight agent provides controlled access to the insight by the receiving agent through the insight-related interactions. For others to gain access to at least certain of the asserting agent's insight, the asserting agent must authorize the insight agent to provide the asserting agent's insight to the receiving agent. Upon obtaining the proper authorization, the insight agent will interact with the receiving agent and distribute the asserting agent's insight to the receiving agent. The authorization information providing the authorization to access the asserting agent's insight may be sent to the insight agent directly or through the receiving agent.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A-2B show a communication flow illustrating multiple insight assertions according to various embodiments of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to using authorization information provided by an asserting agent to control insight-related interactions between a receiving agent and an insight agent. The insight may be information that relates to an entity with whom or a device with which the asserting agent is associated. For clarity and ease of discussion, such insight is generally referred to as insight of the asserting agent. The insight source maintains the insight of the asserting agent, and the insight agent provides controlled access to the insight by the receiving agent through the insight-related interactions. For others to gain access to at least certain of the asserting agent's insight, the asserting agent must authorize the insight agent to provide the asserting agent's insight to the receiving agent. Upon obtaining the proper authorization, the insight agent will interact with the receiving agent and distribute the asserting agent's insight to the receiving agent. The authorization information providing the authorization to access the asserting agent's insight may be sent to the insight agent directly or through the receiving agent. Prior to delving into the details of the present invention, an overview of an exemplary communication environment in which the concepts of present invention may be practiced is described.

Figure 1:
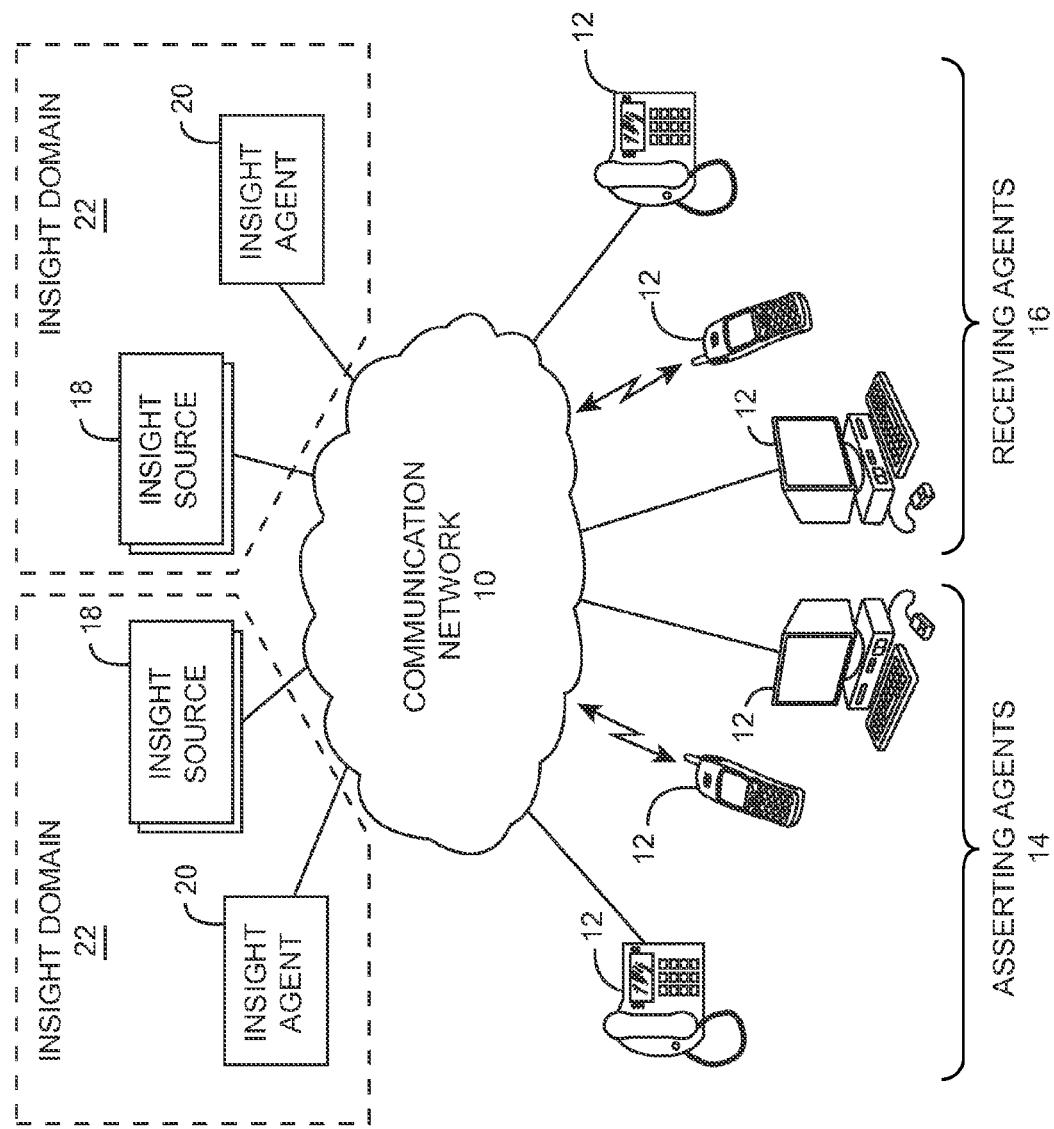
FIG. 1 is a block representation of a communication environment according to one embodiment of the present invention.

With reference to FIG. 1, a communication environment is illustrated to include a communication network 10, which supports communications between various user terminals 12, such as fixed telephone terminals, mobile telephone terminals, and personal computers. Any user terminal 12 may be an asserting agent 14 or a receiving agent 16 for a given situation. An entity may represent a person that is associated with a user terminal 12; a system, such as a user terminal 12, server, computer, or web site; an object, or the like. Accordingly, an asserting agent 14 or receiving agent 16 may be a function that runs on a device that represents the entity. Alternatively, the entity may be a person, system, or object, and the asserting agent 14 or receiving agent 16 may be a device or function running on a device that is associated with the person, system, or object.

In one embodiment, the insight is information that is obtained or generated about the asserting agent by one or more insight sources 18 and cannot be manipulated by the asserting agent 14. Although the insight cannot be manipulated by the asserting agent 14, the distribution of the insight may be controlled, at least in part, by an asserting agent 14 according to the present invention. Distribution of the asserting agent's insight is provided by an insight agent 20, which resides, at least logically, with the insight source 18 in an insight domain 22. The insight agent 20 acts on behalf of the administrator of the insight domain 22 or the insight source 18. As such, the insight agent 20 is the point of contact for receiving agents 16 that desire to obtain insight of the asserting agent 14. The insight agent 20 will have a trustworthy relationship with the administrator or the insight source 18 and is configured to store or access certain insight of the asserting agent 14 to facilitate distribution of the insight to the receiving agents 16. Alternatively, the insight agent 20 will interact with receiving agents 16 to facilitate access to the insight source 18.

As noted, the present invention allows an asserting agent 14 to use authorization information to control insight-related interactions between the receiving agent 16 and the insight agent 20. These insight-related interactions may involve the request for and distribution of an asserting agent's insight by the insight agent 20 to an authorized receiving agent 16. The authorization information may authorize the distribution of the asserting agent's insight from the insight agent 20 to the receiving agent 16 in an insight-related interaction. The authorization information may authorize distribution of all of the asserting agent's insight or a select portion thereof to the receiving agent 16. As will be discussed in greater detail below, such access may be limited to a single user or interaction, a certain number of times, for a defined period, for a defined purpose or context, and the like.

The asserting agent 14 may also set policies to further control how the insight agent 20 distributes their insight. The policies are preferably general policies that control how, to whom, or the format or granularity in which the insight is delivered, once the distribution of the insight is authorized. The policies may also set communication, authentication, security, and encryption requirements for the receiving agent 16. In addition to those policies provided by the asserting agent 14, the insight agent 20 will generally have overriding policies, which control distribution of the asserting agent's insight. These overriding policies may be set by administrators of the insight domain 22 in which the insight source 18 and insight agent 20 reside. Notably, such policies can be housed in the insight agent 20, the asserting agent 14, or both.

Preferably, the insight is personal or unique to the entity or a device associated with the asserting agent 14, yet generated and maintained in the insight domain 22, which is deemed a reliable source for the insight by the receiving agents 16. Exemplary types of insight include, but are not limited to financial or credit bureau information, location information, entitlement information, presence information, health records, government maintained records or information, communication or associated device capabilities, and the like. Notably, presence information is information that bears on the relative availability of the user to communicate with others and may be a function of location, communication activities, or device usage. Government maintained records may range from social security numbers and government identifiers to driver's license and passport information.

For example, the insight domain 22 may be associated with a credit bureau that gathers and maintains credit related information associated with an entity associated with the asserting agent 14. A receiving agent 16, such as a financial institution considering lending the entity money, may need to access the entity's credit information, which is considered the asserting agent's insight. The receiving agent 16 needs to access the credit information from the insight agent 20. Prior to being able to access the credit information, the asserting agent 14 must authorize the distribution of the credit information to the receiving agent 16. Such authorization is facilitated by sending appropriate authorization information to the insight agent 20 or receiving agent 16, which will pass the authorization information to the insight agent 20. Upon receiving the authorization information, the insight agent 20 will effect delivery of the credit information to the receiving agent 16 in accordance with established policy parameters.

In another example, the insight domain 22 may contain an insight source 18 such as a presence or location server that gathers and maintains current presence or location information associated with the entity or devices associated with the asserting agent 14. A receiving agent 16, as a communication contact of the entity, may want to access the presence or location information, which is considered the asserting agent's insight, to determine the best way to initiate communications with the entity or simply locate the entity. Prior to being able to access the presence or location information, the asserting agent 14 must authorize the distribution of the presence or location information to the receiving agent 16. Such authorization is facilitated by sending appropriate authorization information to the insight agent 20 or receiving agent 16, which will pass the authorization information to the insight agent 20. Upon receiving the authorization information, the insight agent 20 will effect delivery of the presence or location information to the receiving agent 16 in accordance with established policy parameters. Those skilled in the art will appreciate the application of the concepts of the present invention to the distribution of other information that relates to an entity or device associated with the asserting agent 14, but is substantially out of the control of the entity or device.

The authorization information may only allow interactions within a given context. As such, interactions between the insight agent 20 and receiving agent 16 may be limited to a given purpose or in association with a certain type of inquiry from the receiving agent 16. For example, only insight that relates to a defined purpose may be made available to the receiving agent 16. The given context may correspond to interactions with a particular receiving agent 16 and that are associated with a certain entity or defined group of entities. For example, the authorization information may dictate that only interactions for credit bureau inquiries, which relate to home mortgages, are allowed in general or by a particular entity. The authorization information may limit the interaction between the insight agent 20 and the receiving agent 16 based on any combination of the above or other criteria. As another example, the authorization information may be provided for insight-related interactions within a set amount of time, for a single interaction, and within a defined context. The context may directly or indirectly identify a specific receiving agent 16 or purpose for which the authorization information is pertinent.

In another embodiment, the authorization information may dictate how much insight may be provided to a receiving agent 16 in general, or within a given context. For example, if the context is a basic, or general, credit check that only requires access to an overall credit score, the insight provided to the receiving agent 16 may merely include the credit score, but not include the details of a complete credit report. As such, only the authorized insight is provided to the receiving agent 16. With the present invention, the use of the insight agent 20 and allowing the asserting agent 14 to control how insight is distributed by the insight agent 20 provides a powerful tool in controlling the distribution of the asserting agent's insight by the insight agent 20. In addition, an asserting agent 14 can also control the granularity of insight provided to receiving agents 16 as appropriate in specific contexts. As an example, location information may consist of actual location coordinates, a building, a city, or only a time zone derived from the actual location insight details as specified by the asserting agent 14 in the authorization provided. Those skilled in the art will recognize numerous ways in which the authorization information may be configured to limit insight-related interactions between the insight agent 20 and any number of receiving agents 16.

Figure 2B:
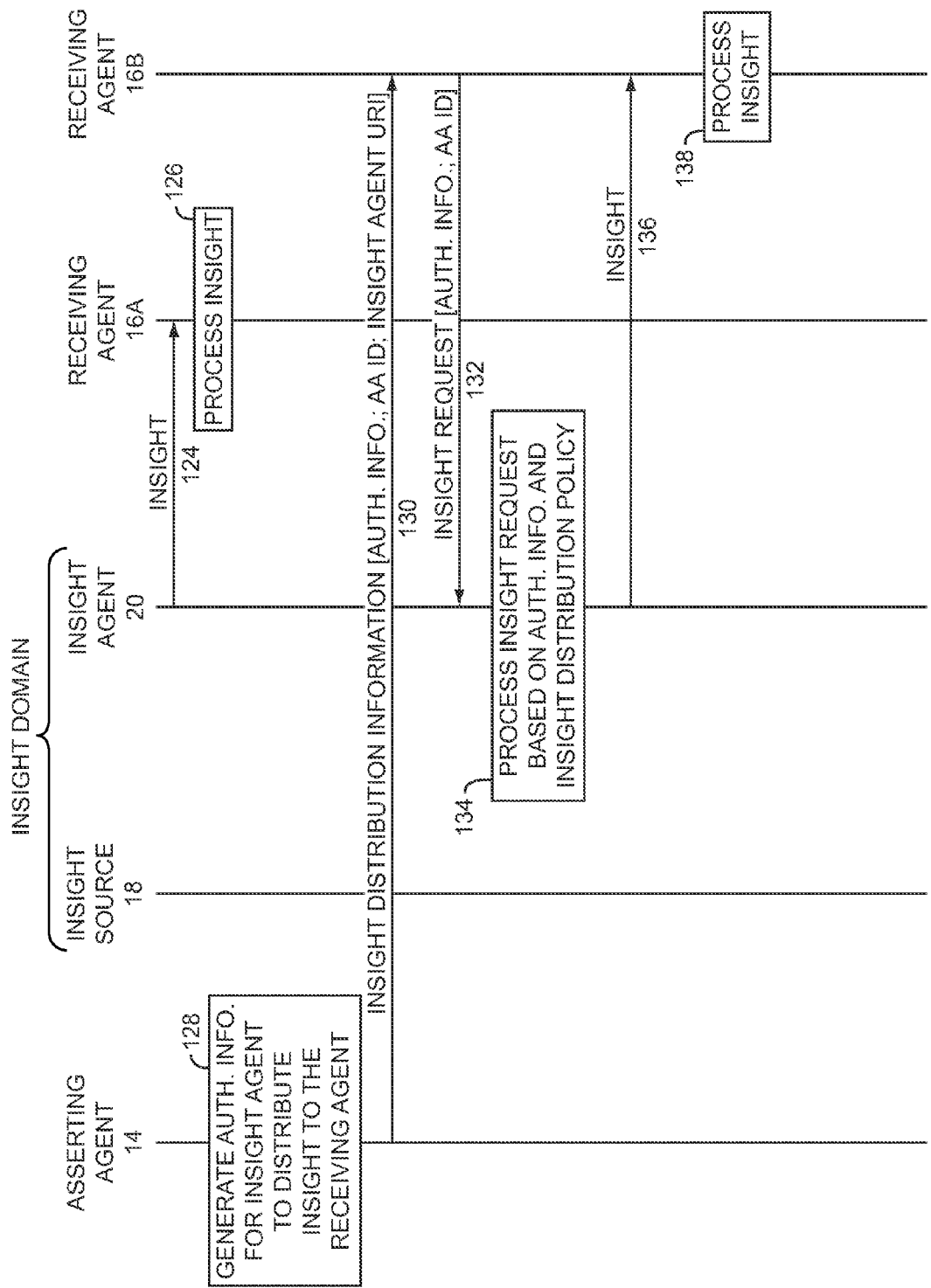

With reference now to FIGS. 2A and 2B, a communication flow is provided to illustrate various scenarios for asserting the insight of an entity associated with the asserting agent 14 to receiving agents 16A and 16B, respectively. The communication flows illustrate how authorization information provided by the asserting agent 14 may be used to control the interaction between the insight agent 20 and one of the receiving agents 16A, 16B according to different scenarios.

With reference to FIG. 2A, assume that the insight source 18 obtains or generates insight for the asserting agent 14 (step 100), and delivers the insight to the insight agent 20 (step 102). The insight agent 20 will store the insight locally or in an available database for future access (step 104). As noted above, the insight agent 20 may be configured to implement a policy that is, at least in part, set by the asserting agent 14 or the entity associated therewith. At the asserting agent 14, the entity may create a distribution policy for distributing their insight (step 106) and have the distribution policy sent to the insight agent 20 (step 108). The insight agent 20 will store the distribution policy to aid in controlling distribution of the insight (step 110). The policy can also be stored in the asserting agent 14 or may be distributed between the asserting agent 14 and the insight agent 20.

At some point, the entity associated with the asserting agent 14 will decide to allow distribution of their insight by the insight agent 20. Assume that receiving agent 16A requires the insight for a particular purpose. To authorize the distribution of the insight to receiving agent 16A, the asserting agent 14 will generate authorization information that is configured to allow the insight agent 20 to either distribute the necessary insight to the receiving agent 16A or to any receiving agent 16 for the particular purpose (step 112). In this first example, the authorization information is sent directly to the insight agent 20, without being passed through the receiving agent 16A (step 114). The insight agent 20 will store the authorization information (step 116), and as described below, will use the authorization information to control distribution of the insight to the receiving agent 16A.

Depending on the embodiment, the asserting agent 14 may send insight distribution information to the receiving agent 16A (step 118), wherein the insight distribution information identifies the asserting agent or the entity associated therewith (AA ID) and provides a uniform resource identifier or like address for the insight agent 20 (insight agent URI). Alternatively, this information may be known by the receiving agent 16A or provided to the receiving agent 16A by the insight agent 20.

When the receiving agent 16A needs to obtain the insight for the entity associated with the asserting agent 14, an insight request is generated and sent to the insight agent 20 (step 120). The insight request may include the identity of the asserting agent 14 or entity associated therewith (AA ID). The insight agent 20 will access the authorization information and any available insight distribution policy provided by the asserting agent 14 or established by the administrator of the insight domain 22. The insight agent 20 will then process the insight request based on the authorization information and the available insight distribution policy (step 122). Assuming the distribution of the requested insight to the receiving agent 14 is authorized based on the authorization information, the requested insight is delivered to the receiving agent 16A according to the insight distribution policy (step 124). The receiving agent 16A is then free to process the insight as desired (step 126).

Continuing with the example, further assume that the entity associated with the receiving agent 14 next decides to allow distribution of certain or all of their insight to receiving agent 16B. The receiving agent 16B may require the insight for the same or a different purpose than that required by receiving agent 16A. To authorize the distribution of the insight to receiving agent 16B, the asserting agent 14 will again generate authorization information that is configured to allow the insight agent 20 to either distribute the necessary insight to the receiving agent 16B or to any receiving agent 16 for a particular purpose (step 128). In this second example, the authorization information is not sent directly to the insight agent 20 as provided above. Instead, the authorization information is passed to the receiving agent 16B (step 130). The authorization information may be sent to the receiving agent 16B alone or with other information. As illustrated, the authorization information is delivered along with the identification of the asserting agent or the entity associated therewith (AA ID) and the URI of the insight agent 20 (insight agent URI) as insight distribution information.

After receiving the authorization information, an insight request may be generated and sent to the insight agent 20 (step 132). The insight request may include the authorization information as well as the identity of the asserting agent 14 or entity associated therewith (AA ID). The insight agent 20 will process the insight request based on the authorization information and any available insight distribution policy that was provided by the entity or established by the administrator of the insight domain 22 (step 134). Assuming the distribution of the requested insight to the receiving agent 14 is authorized based on the authorization information, the requested insight is delivered to the receiving agent 16B according to the insight distribution policy (step 136). The receiving agent 16B is then free to process the insight as desired (step 138).

In either of the above embodiments, interactions between the insight agent 20 and the receiving agents 16 are referred to as insight-related interactions, as long as they relate to requesting insight or distributing insight. An insight-related interaction may also involve communications between a receiving agent 16 and other entities in the insight domain 22, such as the insight source 18. For example, the insight agent 20 may analyze the authorization information and control distribution of the insight from the insight source 18 or an associated database directly to the receiving agent 16. The actual insight need not be stored at the insight agent 20 or pass through the insight agent 20. Notably, the entities depicted in FIG. 1 are logical and may be implemented in the same or different service nodes.

Figure 3:
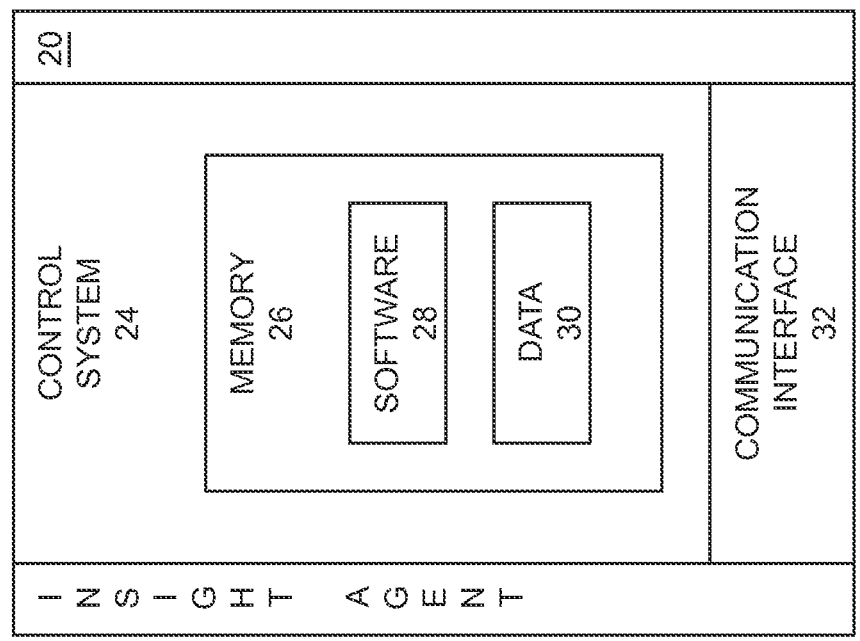
FIG. 3 is a block representation of an insight agent according to one embodiment of the present invention.

With reference to FIG. 3, a block representation of an insight agent 20 is illustrated according to one embodiment of the present invention. The insight agent 20 may include a control system 24 having sufficient memory 26 for the requisite software 28 and data 30 to operate as described above. The control system 24 may also be associated with a communication interface 32 to facilitate communications over the communication network 10.

Figure 4:
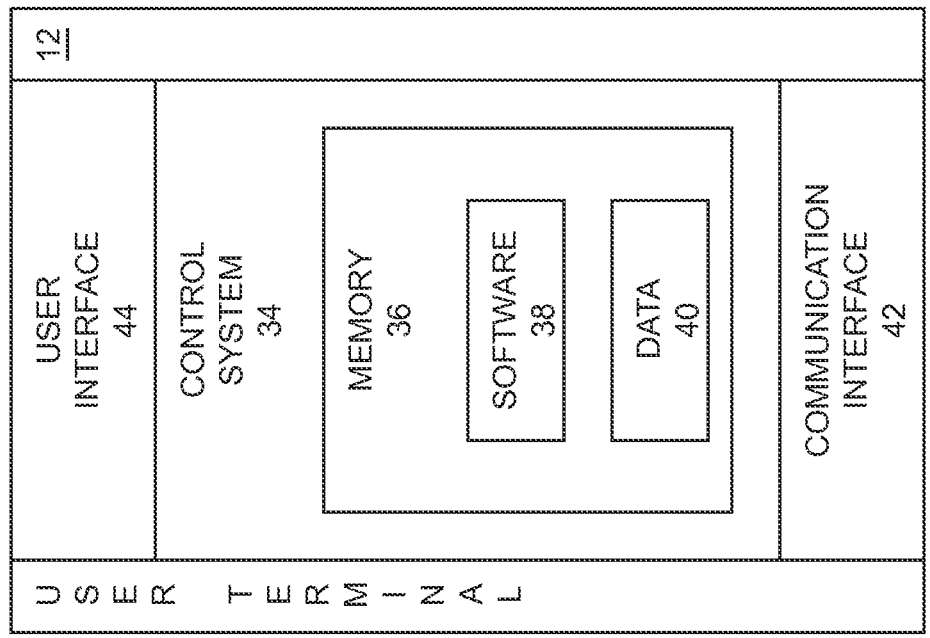
FIG. 4 is a block representation of a user terminal according to one embodiment of the present invention.

With reference to FIG. 4, a user terminal 12 is illustrated according to one embodiment of the present invention. The user terminal 12 may include a control system 34 having sufficient memory 36 for the requisite software 38 and data 40 to provide an asserting agent 14 or a receiving agent 16, as described above. The control system 34 may be associated with a communication interface 42 to facilitate communications over the communication network 10 in a direct or indirect fashion. Further, the control system 34 may be associated with a user interface 44 to facilitate interaction with the user, as well as support communication sessions with other user terminals 12. Thus, the user interface 44 may include a microphone, speaker, keyboard, display, and the like, which operate in traditional fashion for traditional functionality.

Those skilled in the art will recognize improvements and modifications to the preferred embodiments of the present invention. All such improvements and modifications are considered within the scope of the concepts disclosed herein and the claims that follow.

What is claimed is:

1. A method for operating an insight agent comprising:
   receiving from a receiving agent, at a computer-implemented insight agent comprising a memory, authorization information that was originated from an asserting agent and sent from the asserting agent to the receiving agent, wherein the authorization information is configured to control an insight-related interaction between the insight agent and the receiving agent, wherein the insight-related interaction involves providing insight comprised of information about an entity on behalf of whom the asserting agent acts and is generated in a domain that is outside of direct control of the entity, such that the insight cannot be manipulated by the entity;
   providing the insight-related interaction between the insight agent and the receiving agent; and
   controlling, by the insight agent, delivery of the insight from the insight agent to the receiving agent during the insight-related interaction based on the authorization information.

2. The method of claim 1 wherein the insight comprises information related to a device on behalf of which the asserting agent acts.

3. The method of claim 1 wherein the insight is further comprised of information that is maintained in the domain that is outside of direct control of the entity.

4. The method of claim 1 wherein the entity comprises a device on behalf of which the asserting agent acts.

5. The method of claim 1 wherein the entity is comprised of a person.

6. The method of claim 1 wherein the authorization information only authorizes delivery of certain of the insight to the receiving agent, and only the certain of the insight is delivered to the receiving agent during the insight-related interaction.

7. The method of claim 1 wherein the authorization information is configured to authorize a single insight-related interaction between the insight agent and the receiving agent.

8. The method of claim 1 wherein the authorization information is configured to authorize at least one insight-related interaction between the insight agent and the receiving agent for a limited duration.

9. The method of claim 1 wherein the authorization information is configured to authorize insight-related interactions between the insight agent and only the receiving agent.

10. The method of claim 1 wherein the authorization information is configured to authorize at least one insight-related interaction for a defined purpose between the insight agent and the receiving agent.

11. The method of claim 1 wherein the authorization information is configured to authorize at least one insight-related interaction for a defined purpose and for a limited duration.

12. The method of claim 1 wherein the authorization information is configured to authorize only a single insight-related interaction for a defined purpose and for a limited duration.

13. The method of claim 1 wherein obtaining the authorization information comprises receiving the authorization information from the asserting agent.

14. The method of claim 1 wherein receiving the authorization information comprises receiving the authorization information from the receiving agent in association with the insight-related interaction.

15. The method of claim 1 wherein the insight-related interaction corresponds to a request for the insight, and controlling the insight-related interaction comprises:
   determining whether to provide the insight-related interaction with the receiving agent based on the authorization information; and
   providing at least certain of the insight to the receiving agent if the authorization information allows the at least certain of the insight to be provided to the receiving agent.

16. The method of claim 1 further comprising:
   obtaining policy information that was provided by the asserting agent and configured to control distribution of the insight; and
   further controlling delivery of the insight to the receiving agent based on the policy information.

17. The method of claim 1 wherein providing the insight-related interaction comprises receiving a request for the insight, and controlling the insight-related interaction comprises:
   selecting the insight from available insight based on the authorization information; and
   providing the insight to the receiving agent in the insight-related interaction, wherein the insight represents only a portion of the available insight.

18. The method of claim 1 wherein the asserting agent is provided by a first user terminal.

19. The method of claim 1 wherein the receiving agent is provided by a first user terminal.

20. The method of claim 1 wherein a granularity of the insight that is delivered to the receiving agent is controlled based on the authorization information.

21. An insight agent comprising:
   a memory;
   a communication interface; and
   a control system associated with the communication interface and adapted to:
     receive, from a receiving agent, authorization information that was originated from an asserting agent and sent from the asserting agent to the receiving agent, wherein the authorization information is configured to control an insight-related interaction between the insight agent and the receiving agent, wherein the insight-related interaction involves providing insight comprised of information about an entity on behalf of whom the asserting agent acts and is generated in a domain that is outside of direct control of the entity, such that the insight cannot be manipulated by the entity;
     provide the insight-related interaction between the insight agent and the receiving agent; and
     control delivery of the insight from the insight agent to the receiving agent during the insight-related interaction based on the authorization information.

22. The method of claim 1 wherein the insight further comprises presence information about the entity.

23. The method of claim 1 further comprising receiving, at the insight agent from the receiving agent, at least one from the group consisting of: an identity of the asserting agent and an identity of the entity.

24. The method of claim 1 wherein the asserting agent controls a granularity of location information of the asserting agent provided from the insight agent to the receiving agent.

25. The method of claim 24 wherein the granularity of the location information of the asserting agent is selected from the group consisting of location coordinates, a building, a city, and a time zone.

* * * * *